United States Patent [19]

Ogawa

[11] Patent Number: 4,560,457
[45] Date of Patent: Dec. 24, 1985

[54] ADHESIVES FOR BONDING OPTICAL ELEMENTS

[75] Inventor: Kazufumi Ogawa, Osaka, Japan

[73] Assignee: Matsushita Electric Industrial Co., Ltd., Osaka, Japan

[21] Appl. No.: 329,821

[22] Filed: Dec. 11, 1981

[30] Foreign Application Priority Data

Dec. 19, 1980 [JP] Japan ................................ 55-180723

[51] Int. Cl.⁴ ................................................ C08F 8/00
[52] U.S. Cl. .......................... 204/159.16; 204/159.15; 204/159.22; 528/360; 528/374; 528/375; 528/376
[58] Field of Search ............... 528/360, 376, 374, 375; 204/159.15, 159.16, 159.22

[56] References Cited

U.S. PATENT DOCUMENTS

| | | | |
|---|---|---|---|
| 3,441,589 | 4/1969 | Oswald | 528/376 |
| 3,619,393 | 11/1971 | Stahly | 528/376 |
| 3,637,419 | 1/1972 | Lundsager | 528/376 |
| 3,660,217 | 5/1972 | Kehr et al. | 528/376 |
| 3,697,621 | 10/1972 | Kehr et al. | 528/376 |
| 3,809,633 | 5/1974 | Magnotta et al. | 528/376 |
| 4,020,233 | 4/1977 | Morgan | 528/376 |

*Primary Examiner*—Melvyn I. Marquis
*Attorney, Agent, or Firm*—Burgess, Ryan & Wayne

[57] ABSTRACT

Adhesives adapted especially for bonding optical elements and consisting of, as major components, a polyfunctional acrylate and a polythiol, a radical generating photoinitiator, a radical generating heat-activated curing initiator and a stabilizer against premature onset of curing.

11 Claims, 7 Drawing Figures

FIG. 1A
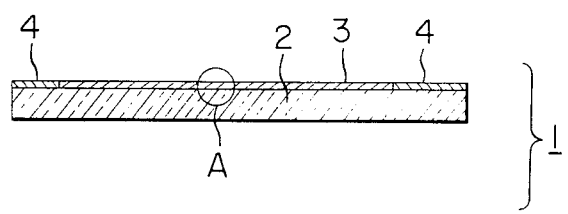
FIG. 1B
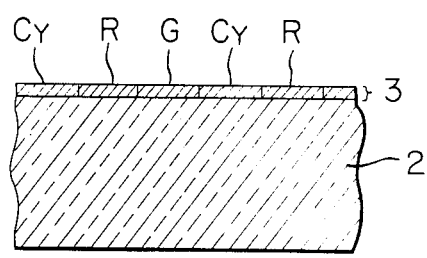
FIG. 1C
| R | G | Cy | R | G | Cy |
| Cy | R | G | Cy | R | G |
| G | Cy | R | G | Cy | R |
| R | G | Cy | R | G | Cy |
| Cy | R | G | Cy | R | G |

ADHESIVES FOR BONDING OPTICAL ELEMENTS

BACKGROUND OF THE INVENTION

The present invention relates to adhesives adapted to bond optical elements and more particularly color mosaic filters over solid-state image sensors.

In order to cement optical lens elements to each other, two types of adhesives are used. One type is thermosetting adhesives such as balsam (the product of E. MERCK A.G.), epoxy adhesives, polyester adhesives, adhesives consisting of polyvinyl acetate, acryl sulfoamide and products of condensation of formalin and the like. The other type is photosetting or photocuring type adhesives such as polyester adhesives (UV-69, 71, 74 and so on, the products of Summers Laboratories-Inc. USA), thiolic adhesives (NOA-61, 63, 65 and so on, the products of Norland), acrylic-epoxy adhesives and the like.

However, there has not been commercially available an adhesive having optimum properties such as curing characteristics and the like for bonding color mosaic filters to solid-state image sensors. In this regard, bonding of color mosaic filters to solid-state image sensors has many problems as will be described below.

It has been considered that the solid-state color image sensor will make considerable contributions to the reduction both in size and weight; that is, to the miniaturization of video cameras. When it is desired to use only one solid-state image sensor in each color camera, a three-color filter (comprising, for instance, red, green and cyane filter elements) must be bonded to the front surface of an array picture elements. At present organic filter elements; that is, three-color filter elements made of organic compounds are widely used and deposited or otherwise formed in a predetermined mosaic pattern over an optical glass sheet. A filter glass sheet thus obtained is bonded over a solid-state image sensor.

When thermosetting type resins which have been widely used in cementing optical lens elements are used, a higher degree of bond strength can be attained. However, the recent trend of the video camera is toward making it more compact in size and lighter in weight so that much efforts have been made in reducing the area of each of picture elements of the solid-state image sensor. In addition, in order to obtain a higher degree of resolution and also a higher degree of optical sensitivity, the spacing between the adjacent picture elements must be reduced as much as possible. As a consequence, various processes have been devised and demonstrated for registering a filter glass sheet with a solid-state image sensor in such a way that every color filter elements on the color filter glass sheet can be correctly aligned with every corresponding picture element on the solid-state image sensor in a one-to-one relationship with a higher degree of dimensional accuracy. However, it has been recently found that with the prior art thermosetting resins, exact registration cannot be attained. More specifically, when a color filter glass sheet and a solid-state image sensor, each having a bonding or contact area of 200 mm$^2$, are bonded together with a layer of an adhesive of less than 10 μm in thickness, the alignment accuracy; that is, a measurement for alignment between the pattern of picture elements on the solid-state image sensor and the mosaic pattern of color filter elements on the filter glass sheet, must be less than 2 μm. To this end, the step for pressing the color filter glass sheet against the image sensor and the step for bonding them together must be carried out simultaneously and the filter sheet must be kept pressed against the image sensor even after the alignment between them has been accomplished until the adhesive is cured.

However, if the thickness of a layer of a thermocuring resin adhesive between the color filter glass sheet and the solid-state image sensor is less than 10 μm during the alignment or registration step, there arise various problems as described below. First, if the curing time is shorter than the alignment time, curing of the adhesive proceeds gradually so that accurate alignment cannot be attained. If the curing time is considerably longer than the alignment time, the residence time will be increased so that a higher degree of productivity cannot be attained. In addition, the color filter glass sheet and the solid-state image sensor tend to be misaligned during the curing process. The misalignment between the filter and picture elements results in degradation in the signal-to-noise ratio (S/N) of the color signal generated. In addition, flicker and color fringing are observed.

The above problems can be solved if an adhesive used will not be cured during the alignment step, but will be cured as fast as possible after the alignment step. Ultraviolet ray-curing type adhesives have such properties as described above, but the objects of the present invention cannot be accomplished by the mere use thereof.

SUMMARY OF THE INVENTION

A first object of the present invention is, therefore, to provide adhesives which exhibit a higher degree of curing sensitivity to the ultraviolet rays.

A second object of the present invention is to provide adhesives which will not evolve air bubbles when it is being cured.

A third object of the present invention is to provide adhesives which will not chemically react with pigments contained in the color mosaic filter.

A fourth object of the present invention is to provide adhesives which can be completely thermally cured if they are partially cured by the irradition with ultraviolet rays.

Briefly stated, to the above and other ends, the present invention provides adhesives which are particularly adapted for bonding color mosaic filters over solid-state image sensors and which contain, as major components, acrylate and polythiol and free radical type photocuring and thermocuring initiators.

BRIEF DESCRIPTION OF THE DRAWINGS

FIG. 1A is a longitudinal sectional view of a color mosaic filter;

FIG. 1B is a view, on enlarged scale of a portion encircled in FIG. 1A;

FIG. 1C is a top view thereof;

CONCRETE DESCRIPTION OF THE PRIOR ART

Referring first to FIG. 1, a color mosaic filter 1, which is to be bonded to the front surface of a solid-state image sensor, comprises a substrate 2 made of an optical glass and a mosaic pattern 3 of color filter elements Cy, R and G deposited or otherwise formed over the top surface of the substrate 2. It further includes light-shielding bands 4 which are extended along the edges of the substrate 2 to surround the mosaic pattern 3 so that when the dummy and transfer regions in the picture element pattern on the solid-state image sensor can be shielded from the incident rays and consequently no noise is generated. The mosaic pattern 3 comprises a plurality of red color filter elements R, cyan color filter elements Cy and green color filter elements G.

Figure 2A:
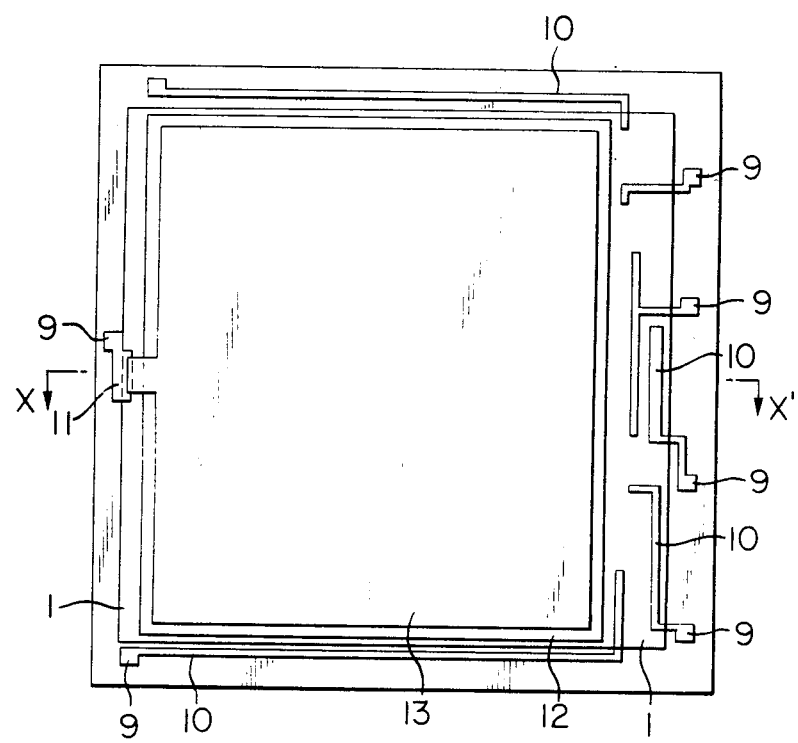
FIG. 2A is a top view of a color filter bonded with an ultraviolet ray-curing type adhesive to a solid-state image sensor.

The color mosaic filter 1 is bonded to the top surface of a solid-state image sensor as shown in FIG. 2. The image sensor comprises a p-type substrate 5, a pattern 6 of picture elements upon which is projected a light image and which comprises a plurality of photodiodes and unit cells of a charge-coupled device which transfer the optical signals derived from the photodiodes to the output and a driver circuit 7 which drives the picture element array or pattern 6 and which is coated with an insulating layer 8. One end of each of metal layers 10 are connected to the driver circuit 7 through windows formed through the insulating layer 8 and the other thereof is connected to a pad 9. An electrode 11 for connection to a photoconductive film 12 is deposited as shown. The photoconductive film 12 consists of, for instance, ZnSe—Zn$_{1-x}$Cd$_x$Te or amorphous silicon and a transparent electrode 13 is coated over the photoconductive film 12. The color mosaic filter 1 is bonded with an adhesive 14 over the top surface of the image sensor in such a way that each of the color filter elements is accurately aligned with each of the picture elements on the image sensor.

Figure 2B:
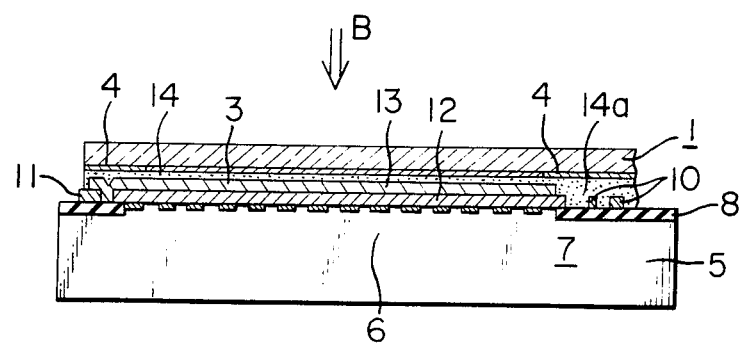
FIG. 2B is a sectional view thereof taken along the line X—X' of FIG. 2A.

When an ultraviolet ray-curing type adhesive is used, ultraviolet rays are irradiated in the direction indicated by an arrow B in FIG. 2B. However, the color mosaic filter 1 has the light-shielding bands 4 as described previously with reference to FIG. 1A, so that the adhesive 14a immediately below them cannot be exposed to the ultraviolet light and consequently remains uncured.

Furthermore, the three color filter elements R, Cy and G are relatively opaque to the ultraviolet light in the wavelength range between 200 and 400 nm. (In practice, their transmissivity is of the order of a few percent.) As a result, the adhesive below them cannot be cured easily or quickly. (In principle, if the intensity of the ultraviolet light to be irradiated is increased, the adhesive can be cured as long as the three color filter elements have some transmissivity to the ultraviolet light even if the transmissivity is of the order of a few percent. However, in practice, the three color filter elements are made of organic pigments, so that if they are irradiated with the high intensity ultraviolet rays, they are degraded and consequently cannot be used in practice.)

DESCRIPTION OF THE PREFERRED EMBODIMENTS

The structural formulas of the chemical compounds used in the preferred embodiments of the present invention are shown below:

Pentaerythritol tetrakis (thioglycolate)

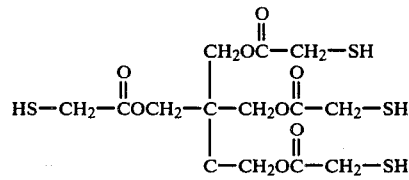

Trimethylolethane tris (β-mercaptopropionate)

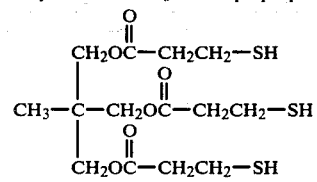

Pentaerythritol tetrakis (3-mercaptopropylether)

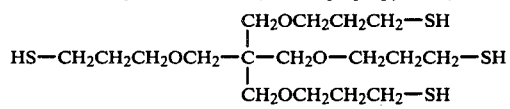

4′-isopropyl-2-hydroxyl-2-methylpropiophenol (Darocur-1116)

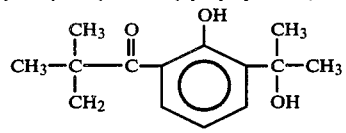

2-hydroxy-2-methylpropiophenol (Darocur-1173)

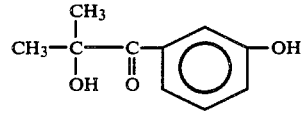

Benzyldimethylketal (Irgacur-651)

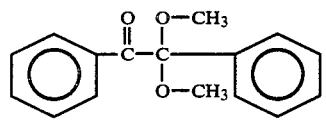

Benzopinacol

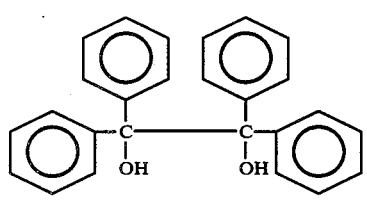

Azobisisobutyronitrile

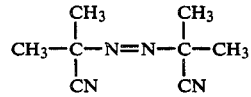

Hydroquinone

-continued

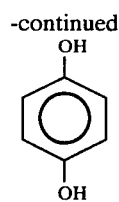

Pyrogallol

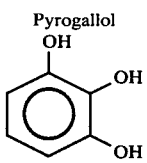

2,6-di-t-butyl-4-methylphenol

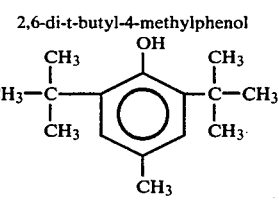

Phosphorous acid
H₃PO₃

Phenothiazine

Dipentaerythritol hexacrylate

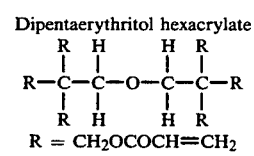

R = CH₂OCOCH=CH₂

Dipentaerythritol pentacrylate

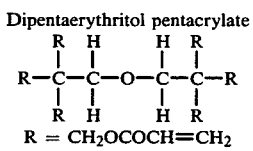

R = CH₂OCOCH=CH₂

Pentaerythritol tetra-thiopropionate

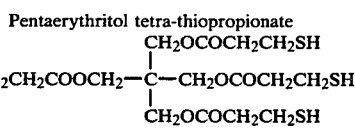

EXAMPLE 1

4 mols of di-pentaerythritol-hexacrylate, 6 mols of pentaerythritol-tetrakis (3-mercaptopropylether), 1% by weight of benzophenone and 1% by weight of benzopinacol are mixed in a beaker and heated at 85° C. They are cured after about five minutes with the hardness number of 85 on the Shore D hardness scale. The cured compound is transparent and colorless.

When the mixture is spaced apart by 10 cm from an ultrahigh-pressure mercury lamp and irradiated at the rate of 100 W/cm, the surface layer of 3 mm in thickness is hardened after five seconds and the cured surface layer has the hardness number of 85 on the Shore D hardness scale. The cured compound is transparent and solid.

EXAMPLE 2

4 mols of di-pentaerythritol pentacrylate and 5 mols of pentaerythritol tetrakis (3-mercaptopropylether) are mixed with an ultraviolet ray-curing initiator and a thermosetting initiator. Following the procedure of EXAMPLE 1, the mixture is cured. The cured compounds have the hardness number of 82 on the Shore D hardness scale and are transparent and solid.

EXAMPLE 3

In EXAMPLE 1, pentaerythritol tetrakis (thioglycolate) is used as polythiol. The cured compound has the hardness number of 85 on the Shore D hardness scale and are transparent and solid.

EXAMPLE 4

In EXAMPLE 2, pentaerythritol tetrakis (thioglycolate) is used as polythiol. The results are same.

EXAMPLE 5

3 mols of di-pentaerythritol hexacrylate, 6 mols of trimethylol ethanetris-(β-mercaptopropionate), 1% by weight of benzophenone and 1% by weight of benzopinacole are mixed in a beaker and heated at 85° C. They dissipate some heat and are cured after about five minutes. The cured compound has the hardness number of 83 on the Shore A hardness scale and are transparent, colorless and solid.

When the mixture is spaced apart by 10 cm from an ultrahigh-pressure mercury lamp and irradiated at the rate of 100 W/cm, the surface layer of 3 mm in thickness is cured after about five seconds. The hardened surface layer has the hardness number of 85 on the Shore D hardness scale and is colorless, transparent and solid.

EXAMPLE 6

3 mols of di-pentaerythritol pentacrylate, 5 mols of trimethylol ethanetris-(β-mercaptopropionate), an ultraviolet ray-curing initiator and a thermosetting initiator are mixed. Following the procedure of EXAMPLE 5, the mixture is cured. In either cases, the cured compounds have the hardness number of 82 on the Shore D hardness scale and are colorless, transparent and solid.

EXAMPLE 7

DPHA (the product of NIPPON KAYAKU K.K.), which is a multi-sensitive acrylate, and pentaerythritol tetrakis (3-mercaptopropylether) are mixed at the weight ratio of 1:1 and the mixture is further added with 1% by weight of benzophenone as an ultraviolet ray-curing initiator and 1% by weight of benzopinacol as a thermosetting initiator. Following the procedure of EXAMPLE 1, the mixture is cured. The cured compounds are colorless, transparent and solid and have the hardness number of 85 on the Shore D hardness scale in either cases.

EXAMPLE 8

In EXAMPLE 7, benzopinacol is not added. The mixture is heated to 100° C., but will not cure.

EXAMPLE 9

In EXAMPLE 7, benzophenone is not added. The mixture remains uncured even after the irradiation of ultraviolet rays.

EXAMPLE 10

In EXAMPLE 7, instead of benzophenone, 1–2% by weight of benzyldimethylketal (the product of CIBA-GEIGY sold under the trademark of "Irgacur-651") was added. Following the procedure of EXAMPLE 1, the mixture is irradiated with the flood of ultraviolet rays. After one to two seconds, the surface layer of 2 mm in thickness is cured. Same results as EXAMPLE 1 can be obtained by the thermosetting.

EXAMPLE 11

In EXAMPLES 1–7, the mixture ratio between a multi-sensitive acrylate and polythiol is varied to 10:1 and 1:10. Ultraviolet ray curing and thermosetting are proceeded under the same conditions. In either cases, the cured compounds are in the form of paste with a high viscosity (higher than $1-3 \times 10^4$ cps).

EXAMPLE 12

The procedure of EXAMPLE 10 is followed except that 0.1% by weight of benzyldimethylketal. The ultraviolet ray curing rate is extremely slow as compared with the case where the added quantity is 1–2% by weight. Only after five minutes, the surface layer of 5 mm in thickness is cured. When 10% by weight of the same compound is added, the curing rate is almost same as the case where the added quantity is 1–2% by weight. The thermosetting can attain the results substantially similar to those attained by EXAMPLE 10.

EXAMPLE 13

The procedure of EXAMPLE 10 is followed except that 0.1% by weight of benzopinacol is added. As compared with the case where the added quantity is 1–2% by weight, the cure time becomes longer, but the heat curing proceeds. When the quantity is increased to 10% by weight and heated to 80° C., the mixture quickly dissipate heat and is cured. In the case of the ultraviolet ray curing, the results are same as EXAMPLE 10.

EXAMPLE 14

The procedure of EXAMPLE 10 is followed except that as an ultraviolet-ray curing initiator, 1–10% by weight of Darocur 1116 or 1173 is added. The results are substantially same as EXAMPLE 10.

EXAMPLE 15

DPHA and pentaerythritol tetra-thiopropionate are mixed at the weight ratios of 2:1 and 1:2. Both the photo-cured and heat-cured compounds are transparent and solid. The cured compound with the ratio of 2:1 has the hardness number of 68 on the Shore D hardness scale while the cured compound with the ratio of 1:2.70.

Of the adhesives described in the above EXAMPLES 1–15 which exhibit excellent characteristics in attaining the objects of the present invention, one which is very important from the standpoint of application in industry and which is relatively easy to manufacture has the following composition:
(1) DPHA (polyfunctional acrylate)
(2) pentaerythritol tetra-thiopropionate (polythiol) (1) and (2) are mixed at the weight ratio of 1:1~0.8:1.
(3) photoinitiator, 1–5% by weight:
 Irgacur 651 or
 Darocur 1116 or 1173
(4) heat curing initiator, 1–5% by weight: benzopinacol and its derivatives
(5) stabilizers:
 0.02% by weight of phosphorous acid,
 0.02% by weight of pyrogallol, and
 0.1% by weight of 2,6-di-t-butyl-4-methylphenol However, it is to be understood that the present invention is not limited to the above-described stabilizers only and that reducing agents such as hydroquinone, phenothiazine and so on can be used.

The above adhesive has the viscosity of about 1000 cps and the coefficient of refraction of about 1.54 and meets all the requirements specified in MIL-A-3920C. In addition, it can be ultraviolet-ray cured or heat cured independently. The experimental results conducted by the inventor show that the above-described composition type adhesive (which contains the stabilizers) is not degraded in viscosity for at least one month when stored about 20° C.

If 1–2% by weight of azobis iso-butyronitrile is used as a heat curing initiator, curing is initiated at 60° C., but $N_2$ gas bubbles are evolved so that the adhesives containing it cannot be used for attaining the objects of the present invention.

The cure time of the adhesives embodying the present invention is three or four times as fast as that of NOA-61, which has been so far considered as having the fastest cure time among commercially available adhesives.

Figure 3A:
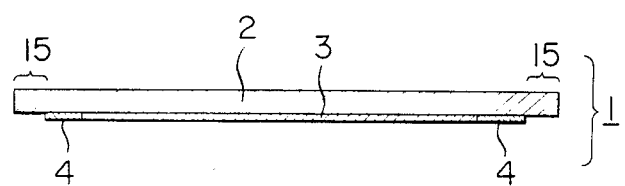
FIG. 3A is a schematic longitudinal sectional view of a color mosaic filter to be bonded over a solid-state image sensor with an adhesive in accordance with the present invention.
Figure 3B:
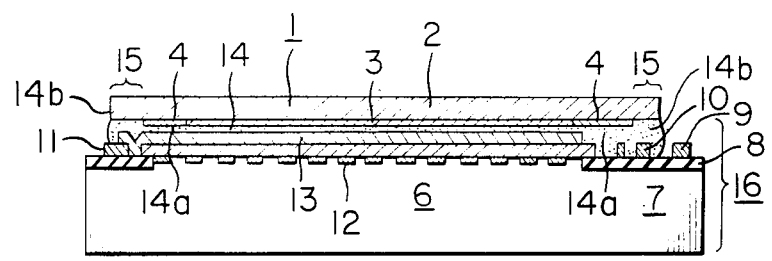
FIG. 3B is a schematic longitudinal view of the color mosaic filter as shown in FIG. 3A to the solid-state image sensor.

Next, the method of bonding a color mosaic filter to a solid-state image sensor with an adhesive embodying the present invention will be described with reference to FIG. 3. A color mosaic filter generally indicated by the reference numeral 1 has transparent bands 15 extended along the edges. The adhesive is applied to the surface of the mosaic pattern 3 and then applied with a pressure so that excessive adhesive and air bubbles can be squeezed out of the bond line. Thereafter, the color mosaic filter 1 is pressed over the solid-state image sensor generally designated by the reference numeral 16 and the color filter elements on the mosaic pattern 3 are accurately aligned with the picture elements or pixels on the image sensor 16. Next, the assembly (that is, the color mosaic filter 1 and the image sensor 16) is irradiated with the ultraviolet rays (for instance, at the rate of 100 mV S/cm² for about 10 seconds) so that the adhesive 14b between the transparent bands 15 of the color mosaic filter 1 and the solid-state image sensor 16 is cured. During this step the adhesive squeezed out of the bond line is masked from the ultraviolet light.

After irradiation, the excessive adhesive squeezed out of the bond line is removed by means of a suitable organic solvent so that the pads 9 can be clearly exposed. Thereafter, the assembly is subjected to heat-curing in an oven for about one half hour, whereby the adhesive which has not been cured by the ultraviolet light irradiation; that is, the portion of the adhesive just below the light shielding bands 4 and the mosaic pattern 3 is cured completely. Thus, the color mosaic filter 1 is securely bonded to the solid-state image sensor 16. The spectra of the pigments in the mosaic color filter 1 remain unchanged. It is quite apparent that if the ultraviolet ray irradiation time is so short that no color degradation of the mosaic pattern 3 occurs during and after the curing step, no problem will arise.

The adhesives of the present invention which are adapted especially for bonding optical elements can be used for bonding filters to other image sensors or the like to provide color image sensors.

The use of the adhesives of the present invention can accrue the following advantages. A filter is tack bonded to a solid-state image sensor by means of the ultraviolet light irradiation as described previously so that the alignment between them can be checked and maintained. Thereafter, the assembly is subjected to the heat curing step so that all the adhesive can be completely cured. Thereafter, the time required for attaining the accurate alignment can be considerably shortened.

Even when the color mosaic filter is formed with the light-shielding bands as described above, the adhesive can be completely cured by the ultraviolet light irradiation and heating without causing the degradation of color pigments contained in the color mosaic color filter.

Consequently, the joint between the color mosaic filter and the solid-state image sensor is very strong and highly reliable. In addition, the use of the adhesives of the present invention can attain a higher degree of productivity heretofore unattainable with the prior art adhesives.

What is claimed is:

1. An adhesive adapted especially for bonding optical elements consisting essentially of a polyfunctional acrylate and a polythiol, which are major components, a free radical generating photoinitiator, a free radical generating heat-activated curing initiator, and a stabilizer,
   (A) said polyfunctional acrylate being
      di-pentaerythritol hexacrylate,
      di-pentaerythritol pentacrylate or
      a mixture thereof,
   (B) said polythiol being
      pentaerythritol tetrakis (thioglycolate),
      trimethylol ethanetris ($\beta$-mercaptopropionate),
      pentaerythritol tetrakis (3-mercaptopropylether),
      a mixture consisting of any two of the above mentioned compounds or
      a mixture of all of said compounds
      the weight ratio of said polythiol to said polyfunctional acrylate being from 10:1 to 1:10.

2. An adhesive as set forth in claim 1 wherein:
   (a) said polyfunctional acrylate is the mixture of
      di-pentaerythritol hexacrylate and
      pentaerythritol pentacrylate;
   (b) said polythiol is pentaerythritol tetra-thiopropionate;
   (c) the weight ratio between said multi-sensitive acrylate and said polythiol is from 1:2 to 2:1,
   (d) said photocuring initiator is 0.1–10% by weight of 4'-isopropyl-2-hydroxy-2-methylpropiophenol, 2-hydroxy-2-methylpropiophenol or benzyldimethylketal; and
   (e) said heat-curing initiator is 1–10% by weight of benzopinacol.

3. An adhesive as set forth in claim 1, wherein said polyfunctional acrylate is di-pentaerythritol hexacrylate, dipentaerythritol pentacrylate or a mixture thereof.

4. An adhesive as set forth in claim 1, wherein said polythiol is pentaerythritol tetrakis (thioglycolate), trimethylol ethanetris ($\beta$-mercaptopropionate), pentaerythritol tetrakis (3-mercaptopropylether), a mixture consisting of any two of the above mentioned compounds or a mixture of all of said compounds.

5. An adhesive as set forth in claim 1, wherein said photocuring initiator is 4'-isopropyl-2-hydroxy-2-methylpropiophenol, 2-hydroxy-2-methylpropiophenol or benzyldimethylketal.

6. An adhesive as set forth in claim 1, wherein said stabilizer is phosphorous acid, pyrogallol, 2,6-di-t-butyl-4-methylphenol, hydroquinone, or phenothiazine.

7. An adhesive as set forth in claim 1, wherein said photocuring initiator is 4'-isopropyl-2-hydroxy-2-methylpropiophenol, 2-hydroxy-2-methylpropiophenol or benzyldimethylketal, in an amount of 0.1–10% by weight.

8. An adhesive as set forth in claim 7, further characterized in that said heat curing initiator is 1–10% by weight of benzopinacol.

9. An adhesive as set forth in claim 8 wherein said stabilizer is phosphorous acid, pyrogallol, 2,6-di-t-butyl-4-methylphenol, hydroquinone, or phenothiazine.

10. An adhesive as set forth in claim 1, consisting essentially of d-pentaerythritol hexacrylate and pentaerythritol tetra-thiopropionate in a weight ratio of 1:1 to 0.8:1, 1–5% by weight of 4'-isopropyl-2-hydroxy-2-methylpropiophenol, 2-hydroxy-2-methylpropiophenol, or benzyldimethylketal; 1–5% by weight of benzopinacol; and an effective amount of phosphorous acid, pyrogallol, 2,6-di-t-butyl-4-methylphenol, hydroquinone, or phenothiazine, as a stabilizer.

11. An adhesive adapted especially for bonding optical elements consisting essentially of a polyfunctional acrylate and a polythiol, which are major components, a free radical generating photoinitiator, a free radical generating heat-activated curing initiator and a stabilizer,
   (A) said polyfunctional acrylate being
      di-pentaerythritol hexacrylate,
      di-pentaerythritol pentacrylate or
      a mixture thereof,
   (B) said polythiol being
      pentaerythritol tetrakis (thiolglycolate),
      trimethylol ethanetris ($\beta$-mercaptopropionate),
      pentaerythritol tetrakis (3-mercaptopropylether),
      a mixture consisting of any two of the above mentioned compounds or
      a mixture of all of said compounds
      the weight ratio of said polythiol to said polyfunctional acrylate being from 10:1 to 1:10,
   (C) said photoinitiator being
      4'-isopropyl-2-hydroxy-2-methylpropiophenol,
      2-hydroxy-2-methylpropiophenol or
      benzyldimethylketal, in an amount of 0.1–10% by weight,
   (D) said heat-activated curing initiator being 1–10% by weight of benzopinacol, and
   (E) said stabilizer being
      phosphorus acid,
      pyrogallol,
      2,6-di-t-butyl-4-methylphenol,
      hydroquinone, or
      phenothiazine.

* * * * *